United States Patent Office 2,927,883
Patented Mar. 8, 1960

2,927,883

N-TRICHLOROMETHYLTHIO-1,2,3-BENZOTRI-AZOLE AS A NOVEL BIOCIDE

John F. Hosler and William B. Hardy, Bound Brook, N.J., assignors to American Cyanamid Company, New York, N.Y., a corporation of Maine No Drawing. Application November 21, 1957
Serial No. 697,770

3 Claims. (Cl. 167—33)

The present invention relates to a new and novel N-trichloromethylthio derivative of a five-membered heterocyclic nitrogen compound, to its preparation and to biocidal compositions prepared therefrom. More particularly, it relates to a novel nematocidal compound which may be characterized by the formula:

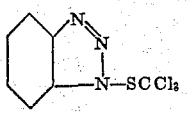

It has heretofore been suggested that certain N-thiotrichloromethyl derivatives exhibit germicidal action on soil containing harmful organisms. Certain cyclic N-trichloromethylthio amides and imides, particularly those in which the $=N-SCCl_3$ group is linked to two acyl groups in the molecule, have been similarly used. Although such compounds may be effective in inhibiting or retarding growth of fungi, bacteria or insects, they possess no practical nematocidal properties when used in dilutions of 0.1% or less. To the present, there remains a demand for a compound which would exhibit useful nematocidal action at these dilutions. If available, such a compound would be of direct benefit in agriculture because crop losses would be reduced due to the eradication of nematodes.

According to the present invention, one such compound has been found. It is: 1-trichloromethylthio-1,2,3-benzotriazole which unexpectedly demonstrates effective nematocidal properties even when used in dilutions of less than 0.1%. The compound is substantially insoluble in water but soluble in organic solvents. Advantageously, it may be suspended or dispersed in water and applied directly to soils, preferably under pressure. Alternatively, the suspension may be modified by the addition thereto of commercially available surface active or dispersing agents. In general, the compound may be formulated by methods known to the art and described with greater particularity below.

The compound of the present invention may be prepared by a method involving the reaction between benzotriazole and perchloromethylmercaptan ($ClSCCl_3$) in an aqueous alkaline medium. All parts given are by weight. For instance, to a suitable vessel containing 12 parts of 1,2,3-benzotriazole and 4 parts of sodium hydroxide in 80 parts of water are added over a two and one-half hour period at 5° C., 18.6 parts of distilled perchloromethylmercaptan. The reaction mixture is stirred for an additional two hours. Resultant precipitated product is next recovered by filtration, washed with water and finally dried. Precipitated product is purified by admixing 250 parts of ether. The solution is clarified by filtration to remove insolubles and the desired dissolved product is next recovered by evaporation under vacuum. Trichloromethylthio-benzotriazole, a yellow tacky solid, analyzes as follows:

Calculated for $C_7H_4Cl_3N_3S$: C, 31.5; H, 1.5; N, 15.7.
Found: C, 31.8; H, 1.58; N, 15.8.

To illustrate the nematocidal activity of the trichloromethylthio benzotriazole compound of the present invention, the following example is presented.

*Example*

To two vials, each containing 0.1% and 0.01% by weight of the benzotriazole compound characterized above, are added an aqueous suspension of 100 Anguillula nematodes in 4 cc. of water. The vials are rotated for twenty hours and at the termination of this period the percent kill is observed and found to be 100%.

It is an advantage to utilize the nematocidal compound of the present invention in dilute concentrations by incorporating the latter compound in a variety of inert carriers or diluents. For example, the compound may be dissolved in an organic solvent such as acetone, ethyl acetate, ethyl alcohol, benzene, kerosene, naphtha and equivalents thereof; or the compound may be admixed with an inert solid carrier, as for example fuller's earth, bentonite and equivalents thereof. In the event a suspension of the active compound is prepared by employing a non-solvent, it may be advantageous to add a dispersing or surface active agent of the known anionic or non-ionic types. The latter include, for instance, the fatty acid esters of polyhydric alcohols available as "Span," the sodium salt of a polymerized propyl naphthalene sulfonic acid (Daxad 11) formed by condensing formaldehyde with propyl naphthalene sodium sulfate and the ethyl oxide condensates of octyl phenol or of higher alkyl phenols such as octyl phenol or nonyl phenol, commercially available as "Triton X-100."

Although the compound of the present invention has been described as possessing nematocidal activity, it also can be employed in dilute concentrations as a herbicide.

The quantity of inert solid or liquid carrier or diluent with respect to the nematocidal compound is not critical. It has, however, been found that up to 10% by weight of the compound based on the weight of the inert carrier is generally sufficient. In most cases, not more than 5% of active ingredient can be employed.

We claim:

1. 1-trichloromethylthio-1,2,3-benzotriazole.
2. A nematocidal composition containing an inert carrier and a small but effective amount of the compound of claim 1.
3. A nematocidal composition of claim 2 wherein the benzotriazole compound is suspended in water.

References Cited in the file of this patent

UNITED STATES PATENTS 2,806,035   Margot et al. _____ Sept. 10, 1957

OTHER REFERENCES

Frear et al.: J. of Economic Entomology, vol. 40, pp. 736–741 (1947).